No. 773,617. PATENTED NOV. 1, 1904.
A. F. WURTH.
PROCESS OF MAKING MOLDS FOR DUPLICATING PHONOGRAPH RECORDS.
APPLICATION FILED MAY 24, 1904.
NO MODEL. 2 SHEETS—SHEET 1.
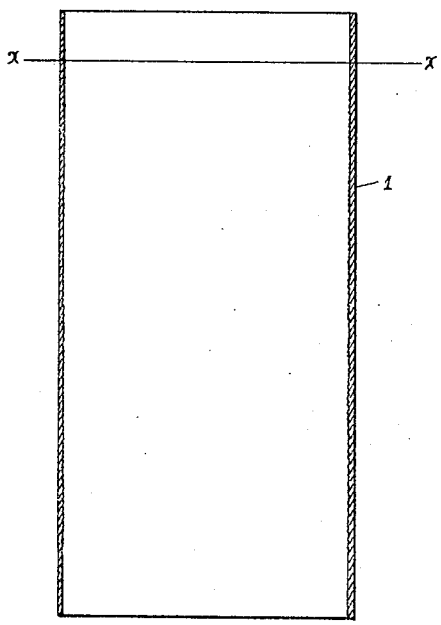
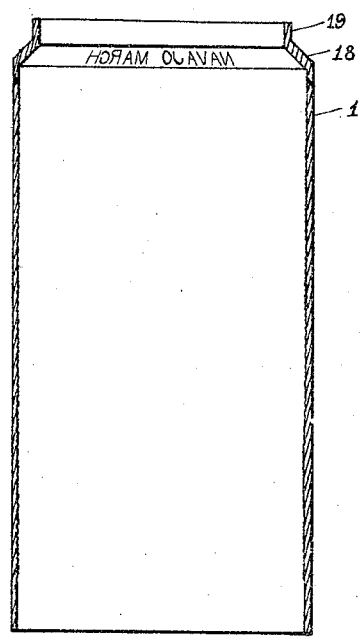
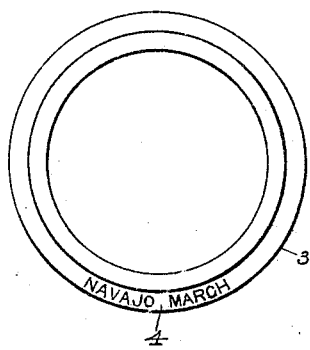

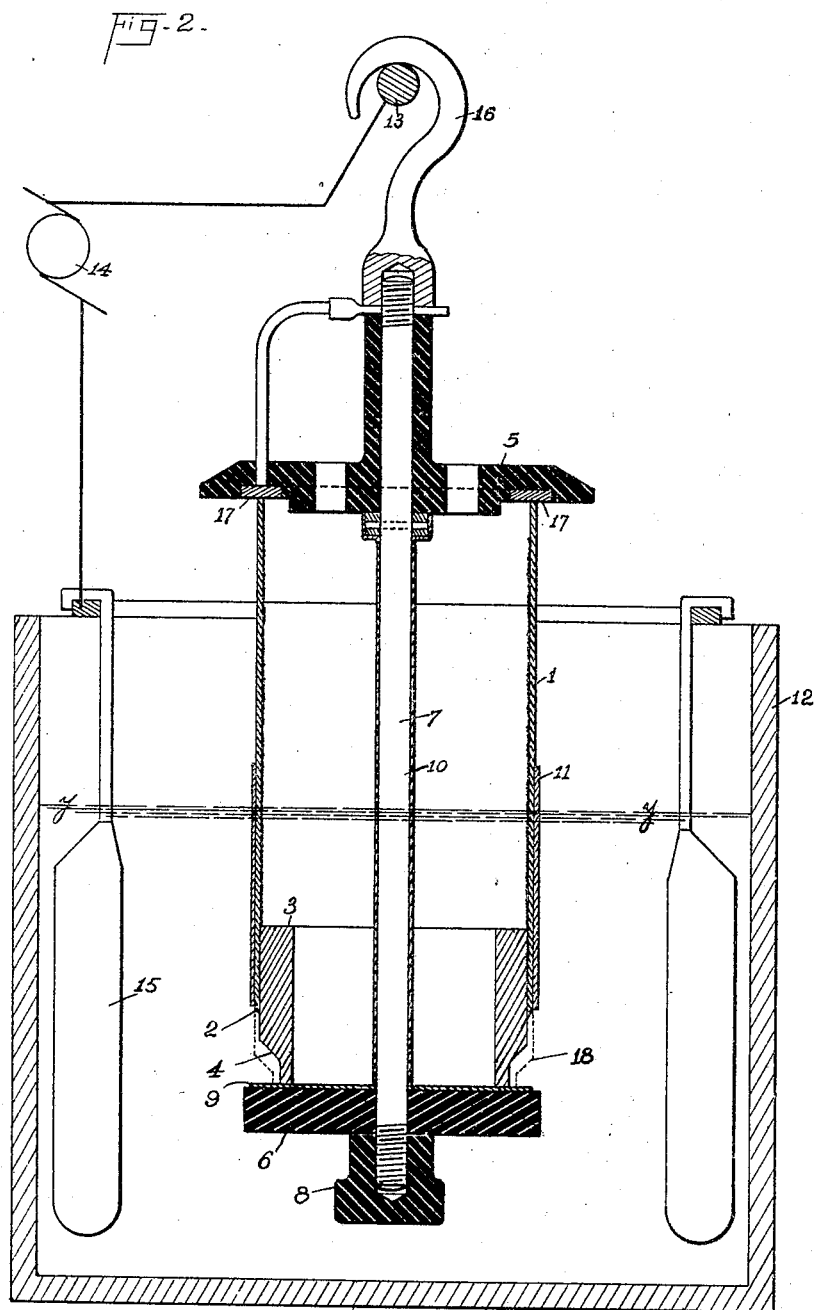

No. 773,617. Patented November 1, 1904.

UNITED STATES PATENT OFFICE.

ALBERT F. WURTH, OF ORANGE, NEW JERSEY, ASSIGNOR TO NEW JERSEY PATENT COMPANY, OF ORANGE, NEW JERSEY, A CORPORATION OF NEW JERSEY.

PROCESS OF MAKING MOLDS FOR DUPLICATING PHONOGRAPH-RECORDS.

SPECIFICATION forming part of Letters Patent No. 773,617, dated November 1, 1904.

Application filed May 24, 1904. Serial No. 209,566. (No model.)

*To all whom it may concern:*

Be it known that I, ALBERT F. WURTH, of 18 Snyder street, Orange, in the county of Essex, State of New Jersey, have invented certain Improvements in Processes of Making Molds for Duplicating Phonograph-Records, of which the following is a description.

At the present time many thousand molds are in use for producing duplicate copies of phonograph-records by pressing, casting, dipping, and analogous processes well known to persons skilled in the art. These molds are in the form of cylinders generally with a very slightly tapered bore and carrying the negative representation of the record in relief thereon. It is desirable for commercial reasons that each phonograph-record should be molded with the name of the particular selection to do away with the necessity of employing separate tags or labels which frequently become lost or misplaced, and this can be done effectively only when the mold itself is provided with an intaglio of the matter which thus requires to be molded on the record. I have found that it is possible to reconstruct the modern cylindrical molds by applying an addition thereto carrying the titles of the corresponding selections, which will therefore be molded simultaneously with the production of the duplicate records and that this may be done in such a way as to show no perceptible joint with the original mold. I am thus enabled to make use of a large number of cylindrical molds now in existence which would otherwise have to be discarded and the cost of which has amounted to many thousands of dollars. Besides this considerable time would be required to make entirely new molds, while by utilizing my invention these old molds may be made over at a slight cost and in very little time.

In order that my invention may be better understood, attention is directed to the accompanying drawings, forming a part of this specification, in which—

Figure 1 represents a sectional view of an ordinary phonograph-mold; Fig. 2, a corresponding view illustrating the manner of converting it into an improved mold wherein the name of the selection will be molded on each duplicate formed therein and showing the parts assembled in the plating-bath; Fig. 3, a similar view of the completely-finished mold, and Fig. 4 a plan view of one of the wax plugs on which the additional plating takes place.

In the views corresponding parts are represented by the same numerals of reference.

The mold 1, which is in the form of a copper shell, carries the usual negative representation of the phonograph-record on its bore. Ordinarily this mold is very slightly tapered and is generally gold-plated or nickel-plated on the record-surface to prevent oxidation. I take one of these molds and shorten it by cutting off the end on the line $x$ $x$, and I then preferably bevel off this end to form an inclined shoulder 2, although this is not absolutely necessary. I now take a plug 3, made, preferably, of the ordinary wax-like phonographic recording material and of the shape shown, formed with the shoulder 4 slightly rounded, as illustrated. On this shoulder I preferably engrave in any suitable way the name of the desired selection, as shown in form 4, together with the trade-mark and number, if desired. Very excellent results have been secured in practice with an ordinary pantograph engraving-machine. Having prepared the plug 3 in this way the latter is fitted very accurately in the beveled end of the mold 1, and this is preferably effected by making the plug of a diameter very slightly larger than the bore of the mold and then contracting it diametrically by a reduction in temperature, so as to permit its introduction into the mold. Preferably before the plug is thus introduced it is finely coated with a very thin conducting-film—for example, of graphite or of a finely-divided metal—applied by a process of vacuous deposit. It will be also understood that this conducting-film may be applied to the plug after the latter has been introduced within the mold, although this is not so desirable, owing to the liability of not covering the entire wax surface, resulting in the formation of a joint or seam in the finished mold, which would therefore appear in the completed duplicates. I now electroplate on the conducting-film a suitable metal to form an extension of the mold, which operation may be performed in any suitable way. For instance, the shell and plug may be clamped between two disks 5 and 6 by means of a bolt 7 and nut 8, a soft-rubber washer 9 being interposed between the disk 6 and the plug 3 to exclude the solution from the interior of the mold. In order to prevent the possibility of plating on the bolt 7, the latter is preferably covered by a rubber sleeve 10, as shown. For the same reason to prevent a deposit on the outside of the mold except on the shoulder 2 the mold is protected by a wrapping of insulated tape or of any other suitable material 11. The mold as thus equipped is supported in a plating-bath 12 from a rod 13, connected with one pole of the generator or other source of supply 14, the other pole thereof being connected to anodes 15 in the usual way.

The level of the solution is shown by the line $y\,y$. The hook 16, engaging the conducting-rod 13, connects with a copper ring 17, embedded in the under face of the disk 5, (the latter being usually made of hard rubber,) so as to form a connection with the source of supply 14 and to permit a deposit 18 to be formed on the conducting film or coating of the plug 3 as well as upon the shoulder 2 of the mold. The electrodeposited addition 18 becomes as intimately connected with the mold as if welded thereto, so that it may be turned off on its outside flush with the mold after the electrodeposition has been completed. The plug 3 is now removed from the mold either by shrinking it out or by breaking the plug to pieces or by melting the material thereof, after which the outside of the extension 18 and the bottom edge of the cylindrical neck 19 are trimmed off to form the complete mold, as shown in Fig. 3.

If in carrying the operations into effect the plug 3 has been coated with gold by a vacuous-deposit process, obviously the interior of the electroplated extension or addition will be gold-plated, and hence protected from oxidation. If, however, graphite is used for coating the plug, the entire mold may be plated on its interior with gold or nickel, or if the film on the original mold is in good condition the interior of the extension alone may be plated with gold or nickel. I find, however, that this is not strictly necessary, since the extension does not carry any part of the record-surface, and hence it is not so important to prevent any bad effects from slight oxidation. I find that by making the mold in this way the joint between the extension 18 and the original mold 1 can hardly be detected under the microscope, nor does it result in any appreciable or audible disturbance in reproducing from records formed in the complete mold.

These molds are capable of effective use in connection with any suitable duplicating process; but they are preferably used in connection with processes wherein a molten wax-like material is introduced into the mold and allowed to set therein to take an impression therefrom, after which the finished duplicate is removed by shrinking it diametrically and removing it longitudinally, as described in patent to Thomas A. Edison, No. 667,662, dated February 5, 1901.

Having now described my invention, what I claim as new therein, and desire to secure by Letters Patent, is—

1. The process of securing an addition to a phonograph-mold, which consists in introducing a conducting-plug into the end of the mold and in electroplating a metal on said plug and on the mold, substantially as set forth.

2. The process of securing an addition to a phonograph-mold, which consists in beveling the end of the mold, in introducing a conducting-plug into the mold and in electroplating on said plug and on the beveled portion of the mold, substantially as set forth.

3. The process of securing an addition to a phonograph-mold, which consists in introducing into the mold a plug having a conducting-coating thereon and in electroplating a metal on said plug and on the end of the mold, substantially as set forth.

4. The process of securing an addition to a phonograph-mold, which consists in shrinking a conducting-plug into the end of the mold and in electroplating a metal upon said plug and upon the end of the mold, substantially as set forth.

This specification signed and witnessed this 23d day of May, 1904.

ALBERT F. WURTH.

Witnesses:
FRANK L. DYER,
A. R. KLEHM.